June 21, 1938.　　W. S. JAMES　　2,121,149
BRAKE LINING TESTING MACHINE
Original Filed Jan. 26, 1929　　5 Sheets-Sheet 3
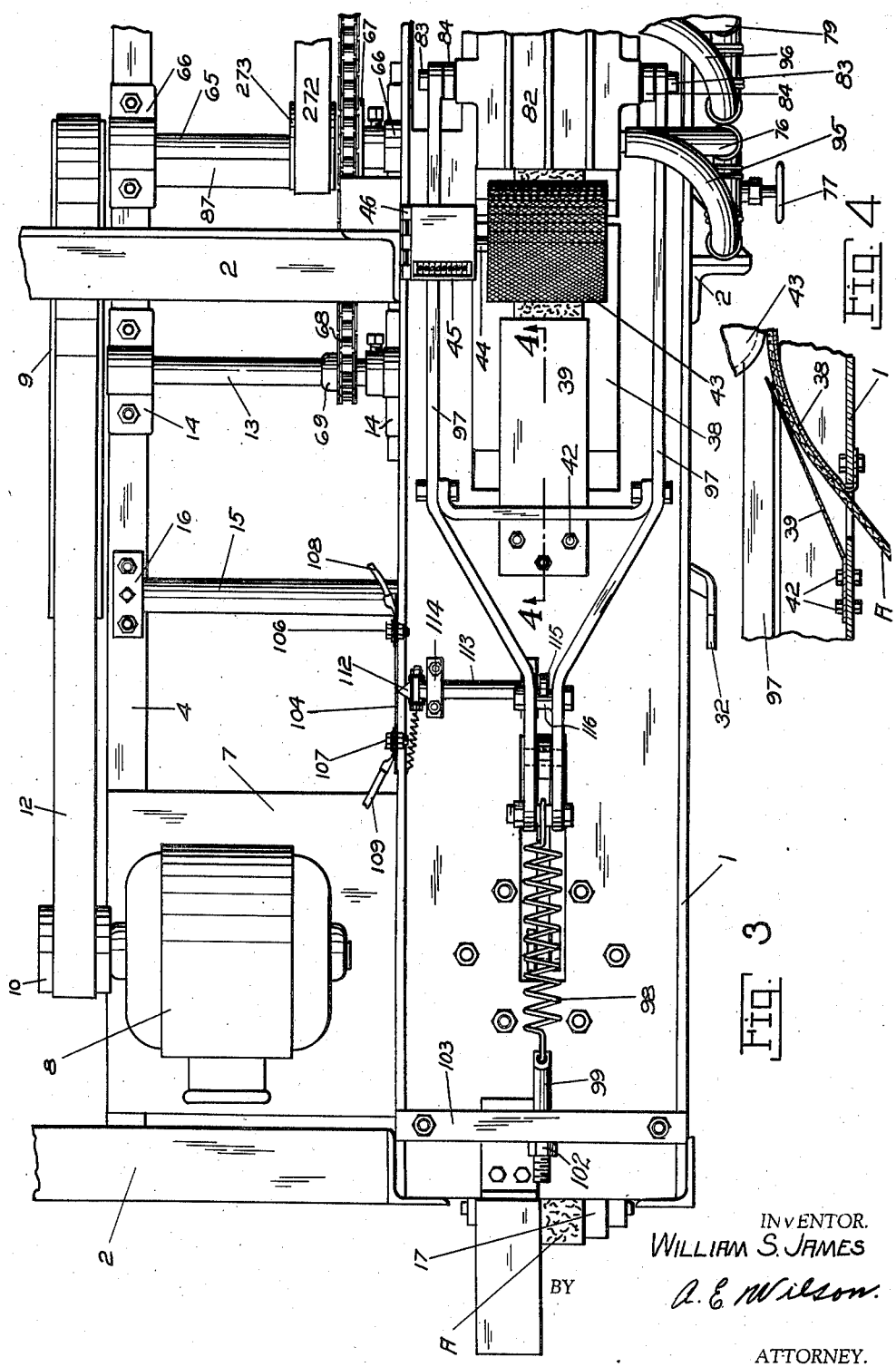
INVENTOR.
WILLIAM S. JAMES
BY
A. E. Wilson
ATTORNEY.

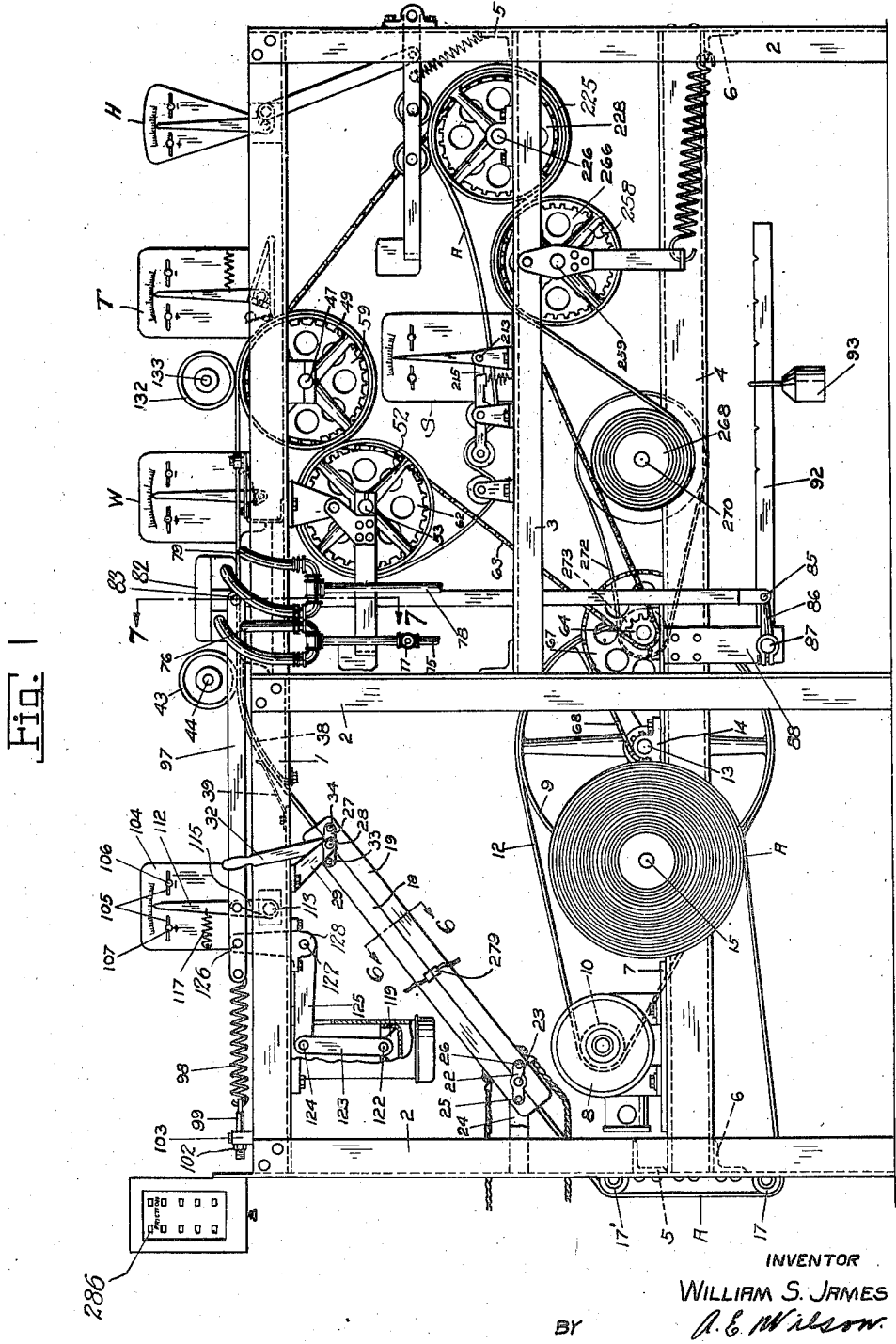

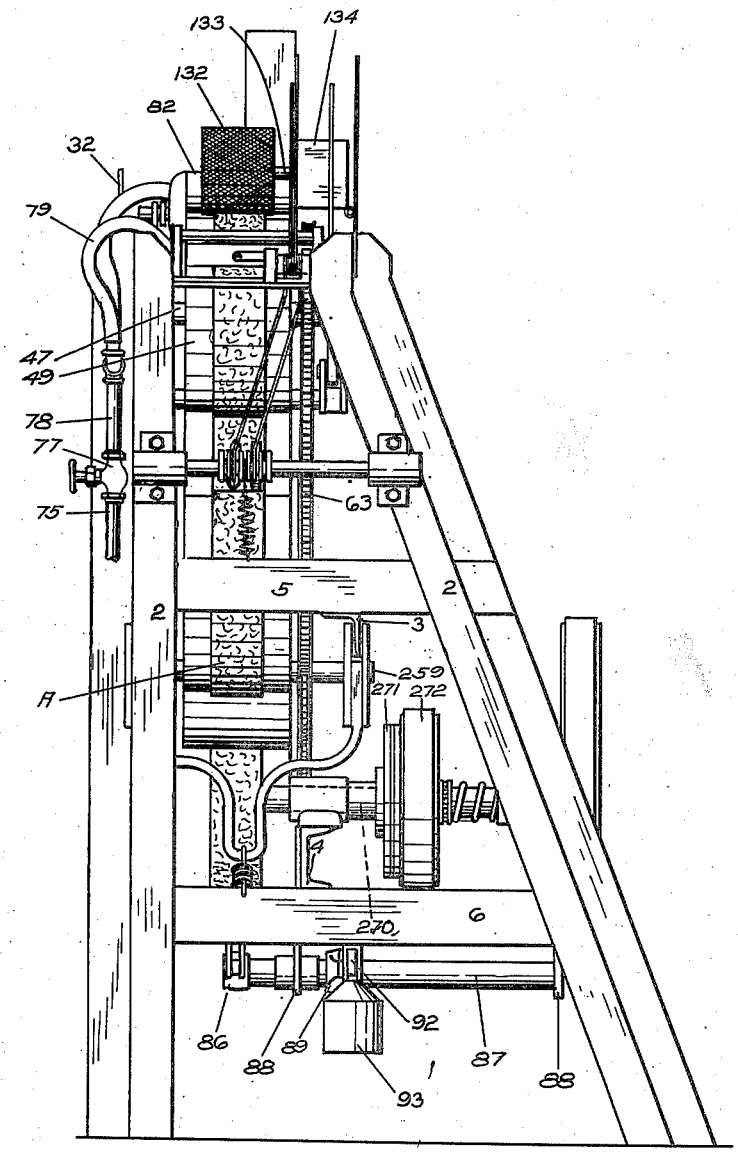

June 21, 1938. W. S. JAMES 2,121,149
BRAKE LINING TESTING MACHINE
Original Filed Jan. 26, 1929 5 Sheets-Sheet 4
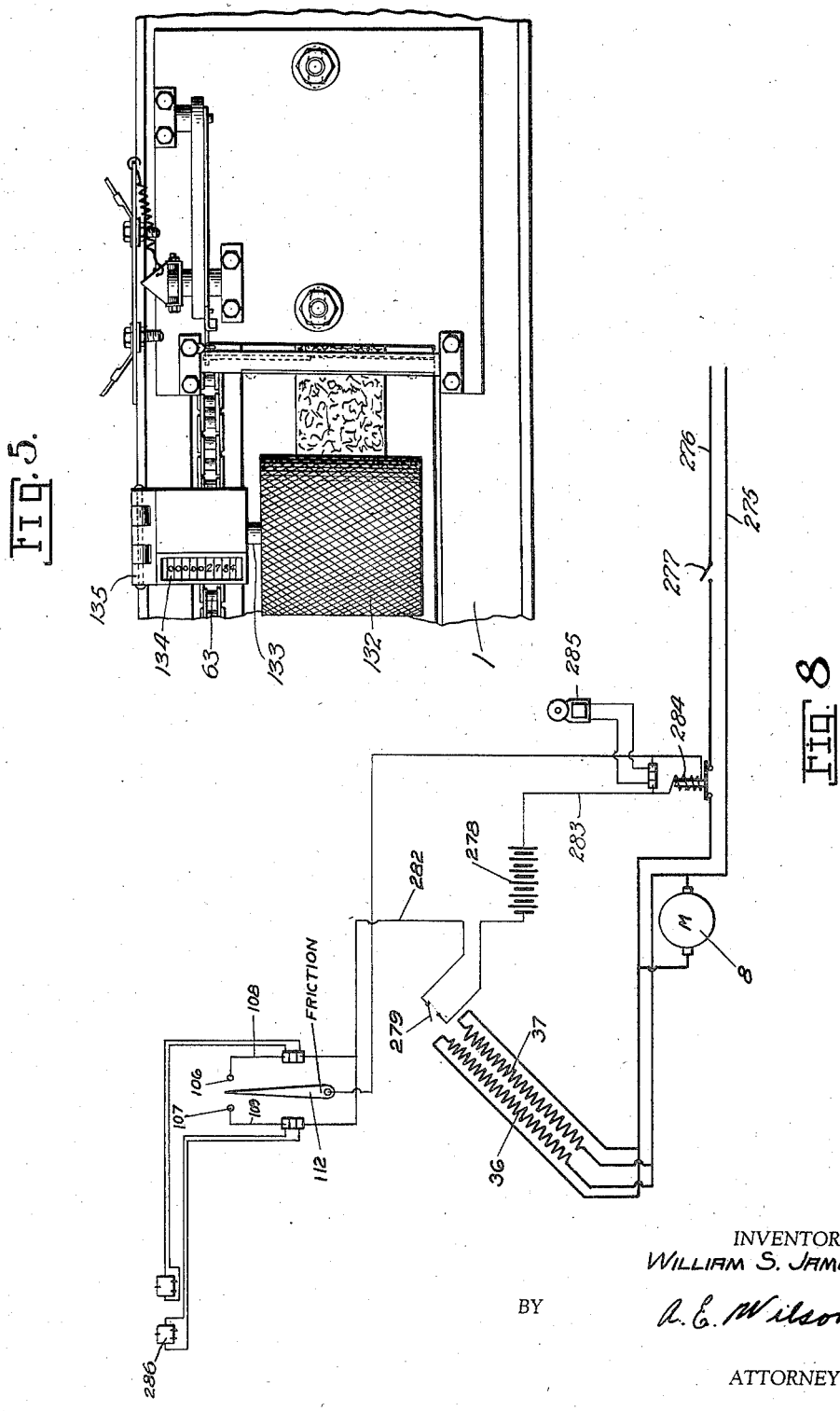
INVENTOR.
WILLIAM S. JAMES
BY
A. E. Wilson
ATTORNEY.

June 21, 1938.                    W. S. JAMES                    2,121,149
                          BRAKE LINING TESTING MACHINE
                 Original Filed Jan. 26, 1929      5 Sheets-Sheet 5

INVENTOR.
WILLIAM S. JAMES
BY
ATTORNEY.

Patented June 21, 1938

2,121,149

UNITED STATES PATENT OFFICE 2,121,149

BRAKE LINING TESTING MACHINE

William S. James, South Bend, Ind., assignor to Bendix Aviation Corporation, South Bend, Ind., a corporation of Delaware Original application January 26, 1929, Serial No. 335,178. Divided and this application March 8, 1935, Serial No. 9,929

14 Claims. (Cl. 265—10)

This invention relates to a machine for testing brake lining prior to mounting the same on the brake shoe, brake band, or other braking medium for commercial use.

It has been found by automobile and other manufacturers, that the brake lining purchased from the makers of that material varies considerably and that it does not run true to grade and specifications. Due to the variations in the brake lining, it has often been found that different shipments of well known and approved brands are so unlike that uniform results are impossible, and that the different linings give entirely different braking results. As an example, different rolls of lining from the same manufacturer may vary greatly in friction coefficient, width, thickness, stiffness or hardness. It will thus be seen that material variations in the different linings due to any of the above or other causes will make the lining to be unsuited for use, especially if the same is to be used as a braking medium where close limits are necessary.

It is, therefore, the principal object of my invention to provide a machine for testing brake lining to determine if the lining has any defects resulting from any of the following causes; "bleeding", friction coefficient and stretching.

A further object is to provide means for measuring the length of a given piece of brake lining before it is stretched and further means for measuring the lining while it is stretched to determine the variations therein.

A further object is to provide means for stopping the travel of the brake lining in the event the lining is outside of the predetermined limits established for any of the tests to which the lining is subjected.

A further object is to provide means for indicating the defect in the lining being tested which causes the stopping of the travel of the brake lining.

These being among the objects of the present invention, the same consists of certain features of construction and combinations of parts to be hereinafter described with reference to the accompanying drawings and then claimed having the above and other objects in view.

In the accompanying drawings which illustrate a suitable embodiment of the present invention, Figure 1 is a side elevation of the machine embodying my invention;

Figure 2 is a rear end elevation thereof;

Figure 3 is an enlarged fragmentary top plan view showing the front portion of the machine;

Figure 4 is a section taken on the line 4—4 of Figure 3, showing the means for guiding the brake lining prior to the stretching thereof;

Figure 5 is an enlarged fragmentary top plan view showing the rear portion of the machine;

Figure 8 is a wiring diagram, showing the electric power line and the indicating mechanisms connected with the several measuring devices.

Figure 6:
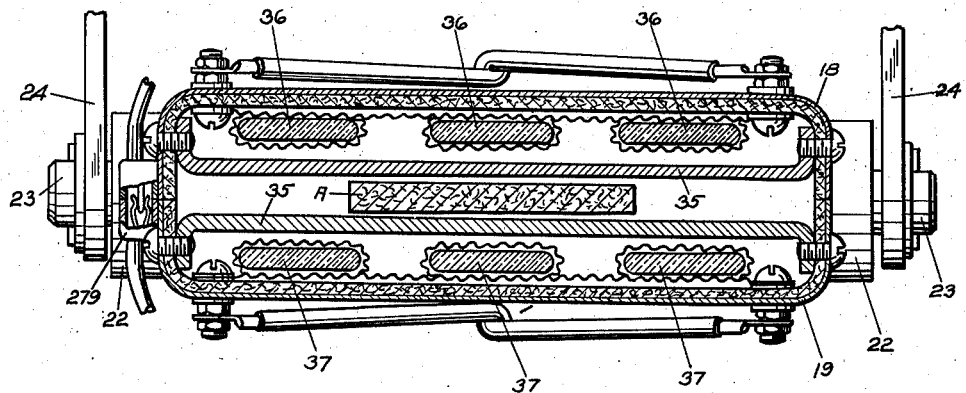
Figure 6 is an enlarged transverse sectional view taken on the line 6—6 of Figure 1, showing the heater for heating the brake lining.

Since it is found in testing brake lining for friction coefficient, bleeding and stretching, as set forth in the claims of the disclosure, that knowledge of other characteristics such as width, thickness, hardness and stiffness is desirable, structures for indicating those characteristics have been shown generally in Fig. 1 at W, T, H and S, respectively.

Referring to the numbered parts of the drawings in which like numerals refer to like parts throughout the several different views, the frame comprises a longitudinally extending top frame channel member 1, a plurality of uprights 2, upper and lower sub-frame members 3 and 4, and upper and lower end cross members 5 and 6. A plate 7 secured to the sub-frame members 4 supports the electric motor 8 having a pulley 10 connected by the belt 12 to the pulley 9 mounted on the shaft 13 which is supported on the sub-frame members 4 by bearings 14, as is clearly shown in Figure 3. A shaft 15 mounted in bearings 16 supported on the sub-frame members 4 is adapted to support the roll of brake lining A to be tested.

The brake lining A is progressively moved through the machine by means to be hereinafter described. In starting the brake lining through the machine, it is unwound from its roll and is passed over a pair of idlers 17 and 17' supported below and above the cross members 6 and 5 respectively. The brake lining A is then passed through a heating casing comprised of two sections having insulated cases 18 and 19, (see Figures 1 and 6). The sections 18 and 19 are pivotally connected adjacent their one end by means of the links 22 mounted on trunnions 23 which are supported by the brackets 24 secured to the uprights 2. The heater sections 18 and 19 have pins 25 and 26 extending from opposite sides thereof on which the links 22 are pivotally mounted for connecting the sections of the heater for operative position. The heater sections 18 and 19 at the end opposite the shaft 23 are joined together by means of a pair of links 27 mounted on trunnions 28 which are supported by the brackets 29 secured to the top frame channel member 1. One of the links 27 preferably has a handle 32 extending therefrom for operating the heater sections 18 and 19 to open and close the same and also for the purpose of operating an electric switch to be hereinafter described.

The heater sections 18 and 19 have pins 33 and 34 extending from opposite sides thereof on which the links 27 are pivotally mounted for connecting the sections for operative position. It will thus be seen that when the handle 32 is moved in a clockwise direction from the position shown in Figure 1 that the links 27 which are pivoted on the trunnions 29 will separate the heater sections 18 and 19 and at the same time disconnect the electric switch 279 which will be described more in detail later on in this specification. Referring to Figure 6 each section 18 and 19 is provided with a guard 35 and with heating elements 36 and 37 suitably connected with a source of electric energy to be hereinafter described.

The heater just described may perform a dual purpose. First, the heating of the brake lining A prior to its being tested for various defects is desirable as the same is then tested under conditions comparable with the conditions under which it is subjected in commercial use. Second, the heating of the brake lining will bring to the surface thereof the binder or impregnating material to determine if the binding agents are of the proper consistency and are best suited to the purpose for which they are intended. This process of "cooking out" or bringing to the surface the impregnating material is commonly called "bleeding" and will be referred to hereinafter in this specification as such.

Referring particularly to Figure 4, a shoe or support 38 is secured to the top channel member 1 to provide a guide for the brake lining A prior to its being subjected to the "stretching" test and to maintain the lining A heated. A spring pressed guard 39 secured by bolts 42 to the channel member 1 normally presses against the brake lining A to hold the same into contact with the shoe 38.

As the brake lining A is progressively moved rearwardly of the machine over the shoe 38, means is provided for measuring the length of the lining before it is stretched, which comprises a roller 43 mounted on a shaft 44 connected with a meter 45. The roller 43 and meter 45 are pivoted by means of a hinge 46 to the top channel member 1 so that the same can be swung clear of the brake lining if so desired.

As the brake lining A is progressively moved rearwardly, the movement of the same will cause the roller 43 to rotate in accordance with the speed of travel of the brake lining to thus indicate the length of the brake lining passing thereunder and register the length thereof by the meter 45 which may be of any of the preferred constructions designed for use as an indicating and measuring medium.

Figure 7:
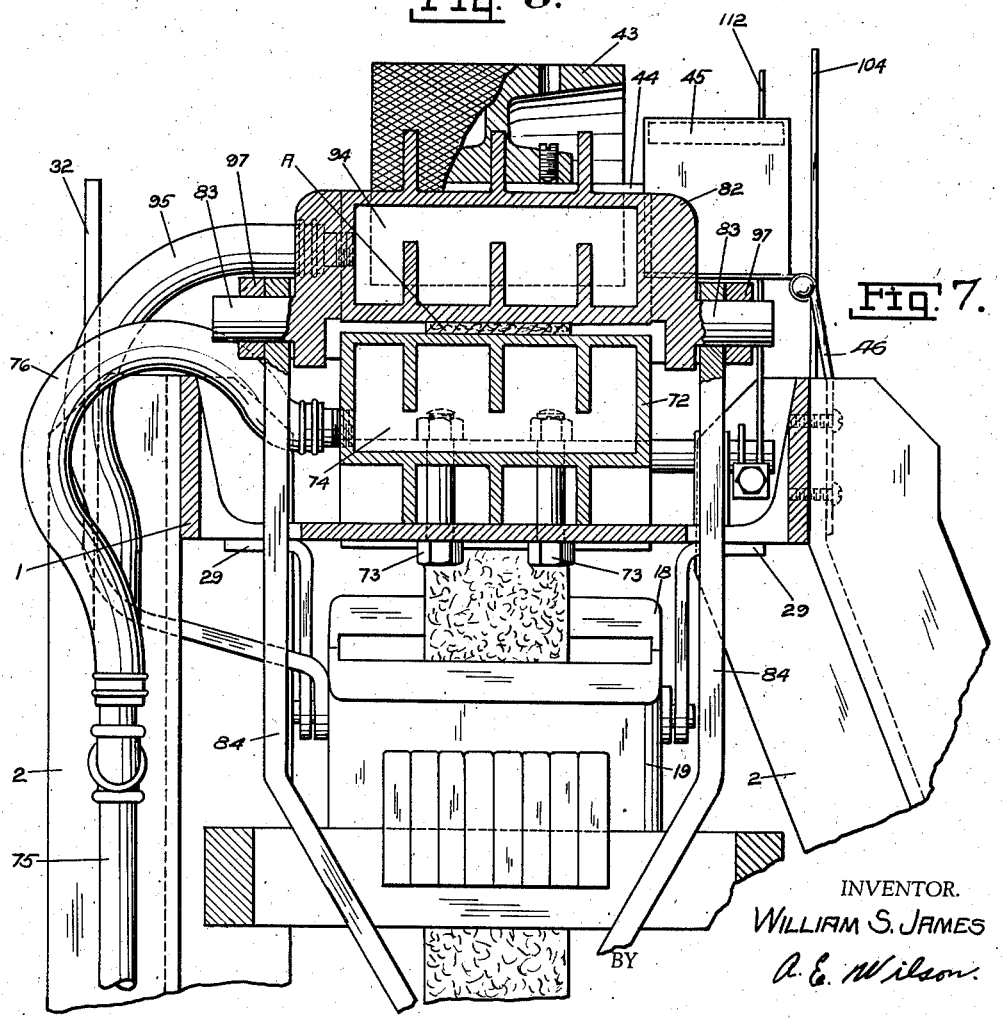
Figure 7 is an enlarged vertical sectional view taken on the line 7—7 of Figure 1, showing the means for testing the friction coefficient of the brake lining.

Referring particularly to Figures 1 and 7, a hollow friction shoe 72 is rigidly secured to the top channel 1 by means of the bolts 73. The shoe 72 is preferably heated by steam, gas or other suitable means, the heating medium being conducted to the hollow chamber 74 formed therein by an inlet pipe 75 and the flexible connection 76. A valve 77 is preferably mounted in the pipe 75 for controlling the inlet of the heating medium to the hollow chamber 74. In the event steam is used as a heating medium, it is desirable to have an outlet for the same and I have accordingly provided an outlet pipe 78 connected with the hollow chamber 74 by means of the flexible connection 79.

As shown in Figures 1 and 7, a hollow shoe 82 slidably positioned above the shoe 72 is provided with trunnions 83 at the opposite sides thereof on which are mounted a pair of depending arms 84 pivotally connected at 85 to a rocker arm 86 mounted on a shaft 87 journalled in brackets 88 secured to the sub-frame members 4. An arm 89 (see Figure 2) similar to the rocker arm 86 and extending parallel therewith is also secured to the shaft 87. A horizontally extending bar 92 supported at one end on the shaft 87 is secured intermediate its ends to the arm 89. The bar 92 functions as a scale beam and the amount of pressure applied to the hollow shoe 82 against the brake lining A can be measured and regulated by the weight 93 which is movable on the bar 92. The position of the weight 93 on the arm 92, of course, will determine the pressure exerted by the shoe 82 and by calculations or experiments the position of the weight 93 on the arm 92 can be regulated for a given pressure which it is desired to exert for a given test.

The hollow shoe 82 is provided with a heating chamber 94 which is connected with a source of heat supply by means of the pipe 75 and the flexible connection 95. The outlet from the chamber 94 is by means of the flexible connection 96 connected at one end of the hollow chamber 94 and at the other end by the pipe 78. Thus both the shoes 72 and 82 are preferably heated from one source of heat supply, the heat being regulated by the valve 77.

Referring particularly to Figures 1 and 3, a pair of arms 97 are pivotally connected at their one end on the trunnions 83 projecting from the opposite sides of the hollow shoe 82. At their opposite ends the arms 97 are attached to a spring 98 which is connected to the bolt 99 extending through the cross member 103 secured to the channel member 1. The tension of the spring 98 is adjusted by means of the nut 102 threaded on the bolt 99. Considerable pressure is applied to the brake lining A as it is progressively moved between the shoes 72 and 82 to determine the friction coefficient of the same, and as the shoe 82 is slidably movable relative to the stationary shoe 72, the movement of the brake lining A tends to move the movable shoe 82 in the direction of travel of the brake lining. The sliding movement of the movable shoe 82 is however, prevented or retarded because of the resistance of the spring 98 interposed between the arms 97 and the cross member 103.

The means for indicating the friction coefficient of the brake lining as tested by the foregoing mechanism will now be described. A plate 104 secured to the channel frame member 1 is provided with slots 105 therein to adjustably receive the terminals 106 and 107 connected with lead wires 108 and 109 respectively. The lead wires 108 and 109 are connected with a suitable source of electric energy to be hereinafter described when more detailed reference is made to Figure 8. An indicator 112 is pivotally mounted on a shaft 113 journalled in bearings 114 mounted on the top frame member 1. A pawl 115 is also mounted on the shaft 113 and normally contacts with the stud 116 mounted between the arms 97. A spring 117 connected at its one end to the indicator 112 and at its opposite end to the plate 104, normally maintains the pawl 115 in engagement with the stud 116 and the indicator 112 in neutral position as shown in Figure 1. It will thus be seen that the indicator 112 is normally held in neutral position between the terminals 106 and 107. If, however, the movable shoe 82 travels with the brake lining, the stud 116 will move the pawl 115 toward the right as viewed in Figure 1, thus swinging the indicator 112 in the same direction into contact with the terminal 106.

If, on the other hand, the friction coefficient of the brake lining is less than the predetermined prescribed limits, the movable shoe 82 will move toward the left or against the travel of the brake lining by means of the spring 98 and the indicator 112 will be permitted to move in an anti-clockwise direction to contact with the terminal 107. As will be herein more fully described, the movement of the indicator 112 either into contact with the terminals 106 or 107 will close an electric circuit thus stopping the travel of the brake lining.

It will of course, be understood that if the friction coefficient is within the predetermined limits, the indicator 112 will move either in a clockwise or anti-clockwise direction depending on whether the friction coefficient is slightly more or less than the correct amount when the indicator is in neutral position. It is only when the friction coefficient is outside the predetermined limits that the indicator moves into contact with either of the terminals 106 or 107 to stop the travel of the brake lining.

To prevent undue vibration of the indicator 112 and inadvertent contact with the terminals 106 and 107, I preferably provide a dash pot 118 having a piston 119 therein pivotally connected at 122 with one end of the link 123. The opposite end of the link 123 is pivotally connected at 124 with one arm of the bell crank lever 125, the other arm of the bell crank lever 125 being pivotally connected at 126 to the arms 97 heretofore described. The bell crank lever 125 is pivoted at 127 on a support 128 which is secured to the top frame member 1. It will thus be seen that movement of the arms 97 and consequently the indicator 112 is retarded by the movement of the piston 119 in the dash pot 118 by the connection of the piston 119 with the arms 97 through the bell crank lever 125 and the link 123.

The pull of the brake lining A by the pulleys 49 and 52 determines the amount that a given length of the lining to be tested will be stretched. This is due to the fact that friction is exerted on the brake lining by means of the shoes 72 and 82 and the pulling force exerted by the pulleys 49 and 52 in pulling the brake lining between the shoes.

A roller 132 positioned above the pulley 49 is mounted on a shaft 133 connected with a measuring meter 134. The roller 132 and the meter 134 are preferably mounted on a hinge 135 secured to the top frame member 1 so that the roller and meter can be swung clear of the brake lining if so desired. The roller 132 and the meter 134 may be identical with the roller 43 and the meter 45 and operates in the same manner to measure the length of the brake lining while the same is being stretched. By the use of the meter 45 which measures the length of the brake lining before it is stretched and the meter 134 which measures the brake lining while it is stretched, the amount that a given length of brake lining will stretch when subjected to the test heretofore described can be readily determined.

In Figure 8 I have shown diagrammatically the means for indicating the defects in the brake lining being tested which are outside of the predetermined limits acceptable for commercial use, and the several means for closing the electric circuit. The motor 8 is connected with the power line indicated at 275 and 276, the same being provided with a switch 277 for closing or opening the circuit to start and stop the motor. It will be seen that the heating elements 36 and 37 are connected in the power line so that at all times when the motor is running the heating elements 36 and 37 will be effective for heating the brake lining.

A battery 278 is preferably provided as a source of electrical energy for the indicating mechanisms to determine the friction coefficient of the brake lining. A switch 279 is preferably mounted on the heater casing elements 18 and 19 formed in the lead wire 282. When the handle 32 is moved to open the heater sections 18 and 19, the switch 279 will be opened, thus opening the circuit in the line 282. In the line 283 from the battery, a relay 284 is positioned to open or close the main power line as will be hereinafter described.

As may be seen clearly in Figure 8, a bell 285 is connected in the line 283 and an annunciator 286 is connected in the lines 108—109 respectively.

Referring now to the means for indicating the defects in the friction coefficient of the brake lining, when the indicator 112 is moved either in a clockwise or anti-clockwise direction, the indicator 112 will contact with one of the terminals 106 or 107 of the lead wires 108 or 109, thus closing the circuit and operating the relay 284 to open the main power circuit, and thus stop the progressive movement of the brake lining. At the same time the relay is operated, a bell 285 connected in the line 283 will sound a signal of warning that the electric circuit has been closed and the movement of the brake lining prevented. Also an annunciator or indicator 286 positioned at any convenient place on the machine will signify that the indicator 112 has been moved to close the electric circuit and the machine has been stopped because of defects in the friction coefficient of the brake lining.

Having thus described the means for testing and indicating the defects of the brake lining, the operation of the device should now be understood. The brake lining A is threaded around the idlers 17 and 17', through the heater element comprising the sections 18 and 19, over the shoe 38, beneath the roller 43 for indicating the length of the brake lining, between the shoes 72 and 82 for determining the friction coefficient of the lining, between the pulley 49 and the roller 132 which measures the length of the brake lining while it is stretched. The lining is then passed over the pulleys 49 and 52 and is directed to and passed between the pulleys 225 and 258 from whence it is rolled on the drum 268, the same having been tested to determine the various characteristics heretofore named, namely, "bleeding", stretch, and friction coefficient.

The sprocket 266 is mounted on the shaft 259 and is driven by the chain 63 which operates to drive the pulleys 225 and 258 in unison.

The means for driving the several mechanisms comprises the motor 8, which drives the pulley 9 by means of the belt 12. The pulley 9 mounted on the shaft 13 drives the sprocket 69 which in turn drives the sprocket 67 mounted on the shaft 65 by means of the chain 68. The shaft 65 has a sprocket 64 thereon which drives the chain 63 which passes around the sprocket 62 mounted on the shaft 53, the sprocket 59 is mounted on the shaft 47, the sprocket 228 mounted on the shaft 226, and the sprocket 266 mounted on the shaft 259. A pulley 273 mounted on the shaft 65 also rotates the drum 268 mounted on the shaft 270 by means of the belt 272, the drum 268 being driven through the clutch mechanism 271 for winding the brake lining thereon after the same has been tested.

This is a divisional application of my copending application Serial No. 335,178, filed January 26, 1929 which matured into Patent 2,022,040 on Nov. 26, 1935.

Having thus described my invention, it will be apparent that formal changes, and details relating to variations of structures can be made without departing from the spirit and substance of my invention, the scope of which is commensurate with the appended claims.

I claim:

1. A device for determining whether the friction coefficient of a roll of brake lining falls within predetermined limits comprising, a frame, means for supporting a roll of brake lining to be tested on said frame, a stationary shoe engaging a face of said lining, a movable shoe engaging the opposite face of said lining, means for moving the lining relative to said shoes, yieldable means for opposing movement of said movable shoe under the frictional drag of the moving lining, means for varying the pressure of said movable shoe on said lining, means for heating said shoes, and means operated by said movable shoe for stopping movement of said lining when the friction coefficient limits thereof are outside of predetermined limits.

2. A device for stretching brake lining comprising, a support for the lining to be stretched, rotatable means frictionally engaging the opposite faces of the lining for progressively moving the same relative to said support, spring-controlled means slidable relative to the lining for resisting the movement of the lining for stretching the same, and means for measuring the length of the lining while it is stretched.

3. A device for stretching brake lining comprising, a support for the lining to be stretched, rotatable means frictionally engaging the opposite faces of the lining for progressively moving the same relative to said support, means resisting the movement of the lining for stretching the same, means carried by said last named means for heating the lining, and means for measuring the length of the lining while it is heated and stretched.

4. A device for stretching brake lining comprising, a support for the lining to be stretched, rotatable means frictionally engaging the opposite faces of the lining for progressively moving the same relative to said support, means slidable relative to the lining for resisting the movement of the lining for stretching the same, means for measuring the length of the lining before it is stretched, and means for measuring the length of the lining while it is stretched whereby the stretch of the lining may be determined.

5. A device for stretching brake lining comprising, a support for the lining to be stretched, means for progressively moving the lining relative to said support, means resisting movement of the lining for stretching the same, means for heating the brake lining while it is being stretched, and means for measuring the length of the lining while it is hot.

6. A device for testing brake lining comprising, a support, means for progressively moving the lining relative to said support, means to determine the "bleeding" of the lining including a heated casing through which the lining is passed, means resisting the movement of the lining for stretching the same, means for maintaining the lining heated while it is being stretched, and means for measuring the length of the lining after the "bleeding" operation while it is still stretched.

7. A device for testing brake lining comprising, the combination of means to determine the "bleeding" of the lining including a heater casing through which the lining is adapted to pass and a heating element within said casing for heating the lining, means slidable relative to the lining for resisting the movement of the lining after it has passed through the heater casing for stretching the same, means for maintaining the lining heated while it is being stretched, and means for measuring the length of the lining while it is stretched.

8. Means for measuring the friction coefficient of a roll of brake lining comprising, a support for the lining to be tested, means for progressively moving the lining relative to said support, a shoe tending to move with the lining, means for resisting movement of said shoe with the lining, means for indicating the movement of said shoe, and means operable when the indicating means moves out of a predetermined range for stopping the movement of the lining to indicate when the friction coefficient of the lining is outside of predetermined limits.

9. Means for progressively measuring the friction coefficient of a quantity of brake lining comprising, a support for the lining to be tested, means for progressively moving the lining relative to said support, stationary and movable shoes engaging opposite faces of the lining, said movable shoe tending to move with said lining, means for resisting movement of said movable shoe with the lining, means for indicating the movement of said shoe, and electric means actuated by the movable shoe to stop the movement of the lining when the coefficient of friction falls outside of predetermined limits.

10. Means for measuring the friction coefficient of brake lining comprising, a support for the lining to be tested, means for progressively moving the lining relative to said support, stationary and movable shoes engaging opposite faces of the lining, said movable shoe tending to move with said lining, means for varying the pressure of said movable shoe on the lining, means for resisting movement of said movable shoe with said lining, and electrically operated means actuated by the movable shoe to indicate when the coefficient of friction of the lining is without predetermined limits.

11. Means for measuring the friction coefficient of brake lining comprising, a support for the lining to be tested, means for progressively moving the lining relative to said support, stationary and movable shoes engaging opposite faces of the lining, said movable shoe tending to move with said lining, means for varying the pressure of said movable shoe on the lining, means for resisting movement of said movable shoe with said lining, means for indicating the movement of said shoe, and means actuated by the movable shoe for stopping movement of the lining when the friction coefficient limits thereof are outside of predetermined limits.

12. A device for measuring the friction coefficient of brake lining comprising, a support for the lining to be tested, means for progressively moving the lining relative to said support, stationary and movable shoes engaging opposite faces of the lining, means for heating said shoes, means for varying the pressure of said movable shoe on the lining, means for variably resisting movement of said movable shoe with the lining, means for indicating the movement of said shoe to determine the coefficient of friction of the brake lining when it is hot, and means actuated by the movable shoe to stop movement of the brake lining when the coefficient of friction is without predetermined limits.

13. A device for testing brake lining comprising, a support for the lining to be tested, means for progressively moving the lining relative to said support, means to determine the "bleeding" of the lining including a heated casing through which the lining is passed, means for stretching the lining while it is still hot, and means for measuring the length of the lining before it is cooled and while it is stretched.

14. A device for testing brake lining comprising, a support for the lining to be tested, means to determine the "bleeding" of the lining including a heated casing through which the lining is passed, means for resisting movement of the lining for stretching the same, means for maintaining the lining heated while it is being stretched, and means for measuring the friction coefficient of the lining including a movable shoe engageable and movable with the lining, means for resisting movement of said movable shoe with the lining, and means for indicating the movement of said shoe.

WILLIAM S. JAMES.